United States Patent [19]

Whitehead, Jr.

[11] 4,141,253

[45] Feb. 27, 1979

[54] FORCE TRANSDUCING CANTILEVER BEAM AND PRESSURE TRANSDUCER INCORPORATING IT

[75] Inventor: Robert C. Whitehead, Jr., Oreland, Pa.

[73] Assignee: Honeywell Inc., Minneapolis, Minn.

[21] Appl. No.: 827,426

[22] Filed: Aug. 24, 1977

Related U.S. Application Data

[63] Continuation-in-part of Ser. No. 672,263, Mar. 31, 1976, abandoned.

[51] Int. Cl.$^2$ .............................................. G01L 9/06
[52] U.S. Cl. ..................................... 73/727; 338/4; 338/42; 73/777
[58] Field of Search ............... 73/721, 727, 734, 746, 73/88.5 SD, 141 A; 338/4, 42

[56] References Cited

U.S. PATENT DOCUMENTS

| | | | |
|---|---|---|---|
| 3,780,588 | 12/1973 | Whitehead et al. | 73/721 |
| 4,023,562 | 5/1977 | Hynecek et al. | 73/727 |

*Primary Examiner*—Donald O. Woodiel
*Attorney, Agent, or Firm*—Laurence J. Marhoefer; Lockwood D. Burton; George E. Bodenstein

[57] ABSTRACT

The pressure transducer includes a semiconductor cantilever beam, a diaphragm, a spacer, and a back plate. The diaphragm, spacer, and back plate are bonded together at their peripheries to form a cup. The ends of the beam are bonded, respectively, to the supported periphery of the diaphragm and to an intermediate deflecting portion thereof, whereby pressure forces within the cup are transmitted by the diaphragm to the beam. Piezoresistive elements are diffused into the surface of the beam to produce an electric signal in accordance with the strain produced in the beam as the result of the pressure forces. In one embodiment, the beam is a flat plate. In another embodiment, the beam includes a portion at the mounting end that is massive relative to the stress sensitive portion of the beam. The juncture of the massive mounting portion and the stress sensitive portion is an abrupt step, whereby a precise fulcrum for the stress sensitive beam portion is provided. In another embodiment, a relatively massive beam portion also is provided at the movable end of the beam remote from the mounting end. Other embodiments include a wire or a spring inserted between the movable end of the beam and the deflecting portion of the diaphragm. The transducer materials and bonds are chosen to minimize hysteresis, which procedure includes making the internal viscosity of the diaphragm at least closely approach that of the beam.

28 Claims, 15 Drawing Figures

FORCE TRANSDUCING CANTILEVER BEAM AND PRESSURE TRANSDUCER INCORPORATING IT

CROSS REFERENCE TO RELATED APPLICATION

This application is a continuation-in-part of application Ser. No. 672,263, filed Mar. 31, 1976, and now abandoned.

BACKGROUND OF THE INVENTION

1. Field of the Invention

This invention relates to force transducers using cantilever beams having stress sensitive portions carrying electrical strain sensing means, and relates also to the application of such transducers to differential pressure and process pressure transmitters for flow, level, and pressure measurement and transmission.

2. Description of the Prior Art

Differential pressure and process pressure transducers and transmitters for flow, level, and pressure measurement and transmission are known in the prior art. Examples of such transmitters are shown in the following U.S. Pat. Nos., which are incorporated herein by reference: 3,712,143 — Weaver et al, 3,559,488 — Weaver, 3,894,435 — Schimada et al, 3,479,739 — Stedman, 3,461,416 — Kaufman, 3,780,588 — Whitehead et al.

The force transducer shown in U.S. Pat. No. 3,712,143 is a so-called cup type unit with piezoresistive strain sensing elements formed in situ on, that is, diffused into the surface of, a silicon diaphragm. The latter forms a flexible wall of the cup. The piezoresistive elements are connected into an electrical bridge network to provide an electrical signal that varies in accordance with the magnitude of the differential or process pressure to which the silicon diaphragm is subjected. Since the diaphragm must be constructed of extremely pure silicon or other suitable semiconductor material, the transducer is restricted as to the thinness and flexibility of its diaphragm. Also, where the diaphragm must be relatively large, as is required in applications involving measurements in the lower pressure ranges, for example, the manufacturing cost of the structure is very high.

U.S. Pat. No. 3,559,488 shows in FIG. 1 a transducer wherein strain gauge elements are attached to a pressure-responsive diaphragm. This patent shows also, in FIG. 2, a transducer wherein strain gauge elements are attached to a beam which is actuated by a pressure-responsive diaphragm. U.S. Pat. Nos. 3,894,435; 3,479,739; and 3,461,416 also show transducers wherein strain gauge elements are attached to beams which are actuated by pressure-responsive diaphragms. Although these constructions free the pressure sensors, that is, the diaphragms, from the material and cost restrictions noted above and resulting from the diffusion of the strain elements into the diaphragms, the resulting transducers are subject to undesired hysteresis which results from the attachment of the strain gauge elements to the diaphragms or beams. Moreover, these transducers are subject to additional undesired hysteresis which, I have discovered, results from the combining in the transducers of materials having different internal viscosities.

The force transducer of U.S. Pat. No. 3,780,588 embodies a non-cup structure wherein piezoresistive elements are diffused into the surface of a silicon beam having one end mounted in a fixed manner. The other end of the beam is moved in accordance with the expansion and contraction of a bellows which is exposed to the differential pressure or process pressure under measurement. While this arrangement frees the pressure sensor, that is, the bellows, from the restrictions noted above, and frees the transducer from the undesired hysteresis which results from the attachment of strain gauge elements, this arrangement is still subject to the noted additional undesired hysteresis which results from the combining of materials having different internal viscosities, e.g., the materials of the beam and the bellows.

Further problems encountered in the use of the beams shown in the five last-mentioned patents are those of providing a precise fulcrum for the flexed section of the beam, providing a mounting that is unaffected by temperature changes, and providing a way to attach a spring or other force transmitting means to the movable end of the beam without creating concentrations of stress, and thereby non- uniform strain patterns, in the flexed section of the beam.

SUMMARY OF THE INVENTION

Among the objects of the present invention is the provision of an improved force transducer which avoids the above-described problems of the prior art transducers. A further object of the invention is to provide an improved transducer of the type utilizing a diaphragm wherein no restrictions are imposed on the diaphragm because of the use of diffused semiconductor strain gauge elements, wherein there is no attaching of strain gauge elements or the noted resulting hysteresis, and wherein the noted additional hysteresis of the previously known transducers is minimized.

Another object of the present invention is to provide an improved transducer beam structure which avoids the above-noted fulcrum, mounting, and force transmitting means attaching problems encountered in the prior art.

In accomplishing the foregoing and other objects, the transducer structure of the present invention employs a semi-conductor cantilever beam which is arranged to be actuated by a pressure-responsive diaphragm, and which is provided with piezoresistive or other semiconductor strain gauge elements diffused into the surface of a stress sensitive portion of the beam. In this way, the noted hysteresis resulting from the attachment of strain gauge elements is avoided without imposing the noted restrictions on the diaphragm. Further, in order to minimize the noted additional hysteresis, the diaphragm and associated components are desirably formed of materials which have an internal viscosity which at least closely approaches, if not equals, that of the semiconductor beam. Additionally, the diaphragm, the beam, and the associated components are desirably joined or connected by means of bonds which preserve the unitary internal viscosity of the transducer structure and hence aid in the minimization of the noted additional hysteresis.

The aforementioned further problems encountered with the prior art beams are avoided in accordance with the present invention by fabricating the beam to have a mounting portion at one end which is massive relative to the stress sensitive portion, and/or to have a terminating portion at the other or movable end which is massive relative to the stress sensitive portion. An abrupt step is formed at the juncture between the massive mounting portion and the stress sensitive portion to provide a precise fulcrum for the stress sensitive portion. The massive terminating portion facilitates the attachment to the beam of the force transmitting connecting means by which the beam is deflected, while preventing the creation of concentrations of stress in the flexible stress sensitive portion of the beam and thereby the introduction into the latter of a non-uniform strain pattern.

BRIEF DESCRIPTION OF THE DRAWINGS

A better understanding of the present invention may be had from the following detailed description when read in connection with the accompanying drawings, wherein.

DESCRIPTION OF THE PREFERRED EMBODIMENTS

Figure 1:
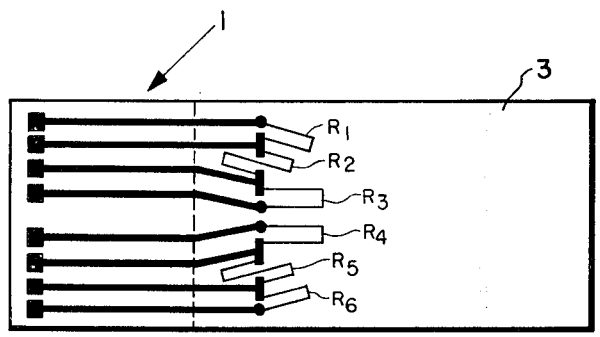
FIGS. 1, 2, and 3 are top, side, and end views, respectively, showing a semiconductor cantilever beam having piezoresistive elements diffused into the top surface of the beam.
Figure 2:
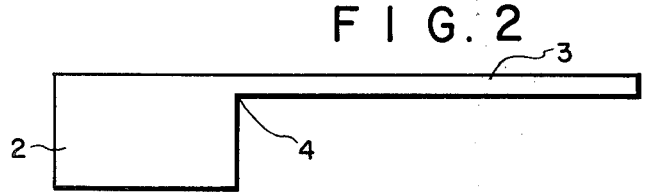
Figure 3:
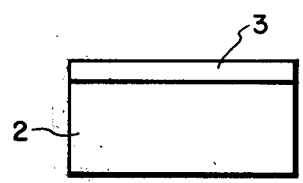

FIGS. 1, 2, and 3 illustrate one embodiment of the improved semiconductor cantilever beam according to the present invention. The beam, designated 1, is desirably fabricated from a single semiconductor block or crystal, such as a silicon crystal, and hence is of unitary construction. The beam includes a relatively thick and massive mounting or supporting portion 2, and a relatively thin, low mass, slightly flexible, stress sensitive portion 3. The beam is so ground that, at the juncture of the mounting portion 2 and the flexible portion 3, an abrupt step 4 is formed. This provides a desirable and necessary precise fulcrum for the portion 3. Also, the effects of changes in the temperature to which the beam is subjected are minimized by the integral nature of the portions 2 and 3.

As seen in FIG. 1, piezoresistive elements or resistors are diffused on or into the top surface of the beam portion 3, near the step 4. These resistors are designated $R_1$, $R_2$, $R_3$, $R_4$, $R_5$, and $R_6$. The resistors $R_1$ through $R_6$ typically comprise a semiconductor of opposite conductivity type from that forming the body of the beam, and may be formed, for example, by surface diffusion of suitable doping elements. Piezoresistive elements formed in this way are isolated electrically from the body of the beam by the p-n junctions which result between them. Other methods may be employed, if desired, for forming the piezoresistive elements on the surface of the beam.

Resistors $R_3$ and $R_4$ extend in the direction of the beam and are arranged closely adjacent each other on opposite sides of a line running centrally of the length of the beam. Resistors $R_1$ and $R_2$ are disposed on the surface of the beam on the same side of the said line as resistor $R_3$. These resistors extend along directions which are not parallel to said line but intersect the latter within the confines of the beam. Resistors $R_5$ and $R_6$ are disposed on the other side of the said line and extend in non-parallel directions toward the latter, also intersecting said line within the confines of said beam.

Figure 15:
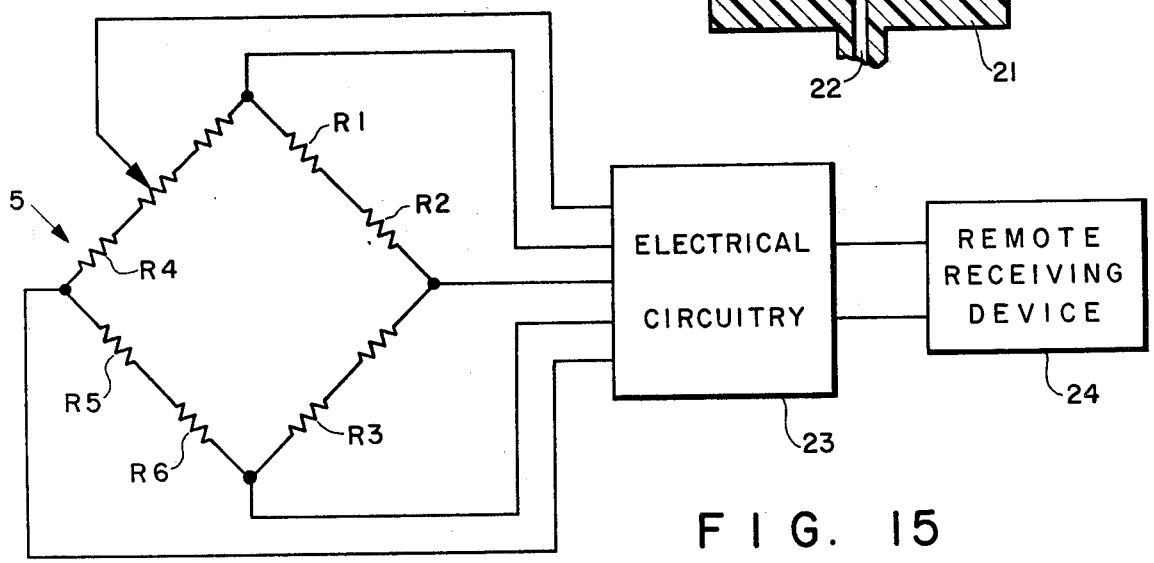
FIG. 15 is a schematic diagram illustrating the connection of an electrical transmission circuit to the piezoresistive elements of any of the beams of FIGS. 1 through 14.

Reference to FIG. 15 shows that the resistors $R_1$ through $R_6$ are connected in a wheatstone bridge 5. Resistors $R_3$ and $R_4$ are the only strain sensing resistors and are connected in opposite bridge arms. Resistors $R_1$ and $R_6$ act as dummy resistors in the other two arms, respectively, of the bridge. Resistors $R_2$ and $R_5$ are connected in the said two last mentioned arms, respectively, and are used for temperature compensation purposes.

The manner of forming the resistors $R_1$ to $R_6$ in the surface of the beam, their relative disposition thereon, and their manner of operating, form no part of the present invention, and will not be further described herein in order to avoid undue complication of the description.

Figure 4:
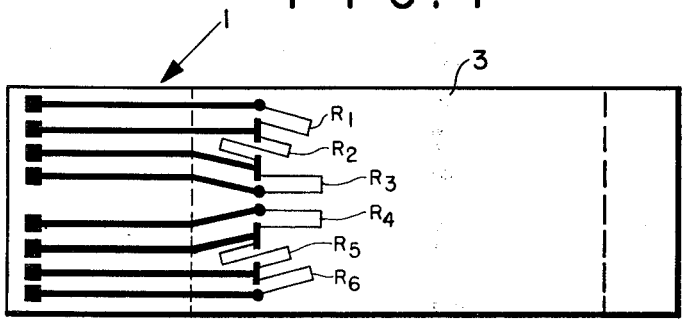
FIGS. 4, 5, and 6 are top, side, and end views of a modified form of cantilever beam.
Figure 5:
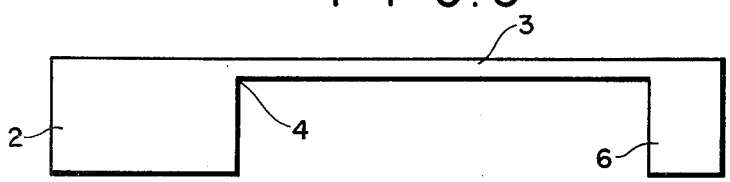
Figure 6:
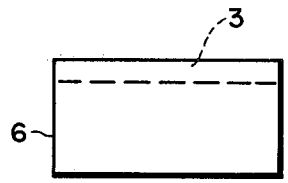

FIGS. 4, 5, and 6 show another embodiment of the cantilever beam 1 according to the present invention. In this embodiment, the beam is ground so as to leave a relatively thick and massive terminating portion 6 of semiconductor material at the movable or free end of the beam, in addition to the portion 2 at the fixed or mounting end of the beam. The massive section 6 at the free end of the beam is provided to facilitate attachment of the force applying and deflection producing means to the end of the beam without creating concentrations of stress and a non-uniform strain pattern in the flexible portion 3 of the beam. In other respects, the beam 1 of FIGS. 4 to 6 may be identical to that of FIGS. 1 to 3. Accordingly, like parts or components have been designated by corresponding reference numbers.

Figure 7:
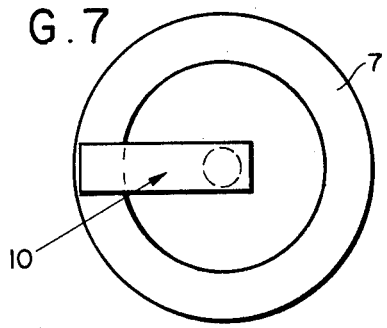
FIGS. 7 and 8 are top and sectional views, respectively, of a diaphragm type pressure transducer having a beam in the form of a flat semiconductor plate.
Figure 8:
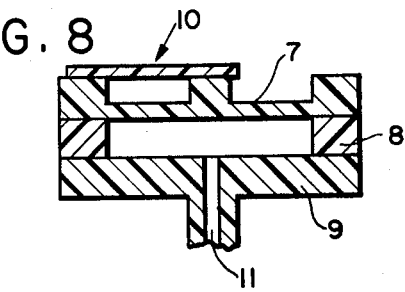

FIGS. 7 and 8 illustrate a semiconductor beam-diaphragm pressure transducer according to the present invention. Specifically, there is provided a differential pressure sensor cup structure in which a circular diaphragm 7, a ring spacer 8, and a back plate 9 are all bonded together at their peripheries to form the cup. An opening 11 is provided in the back plate 9 for subjecting the lower surface of the diaphragm 7 to the pressure under measurement.

A beam 10, in the form of a semiconductor plate, such as a plate formed from a single silicon crystal, has one end mounted on the supported raised periphery of the diaphragm 7, and has its other, movable end connected to the deflecting portion of the diaphragm 7 at the center thereof. The mounting and connection of the ends of the beam 10 to the diaphragm 7 may be effected by bonding. Although not shown in FIGS. 7 and 8, resistors similar to the resistors $R_1$ through $R_6$ are assumed to be diffused into the surface of the central or stress sensitive portion of the beam 10, as in the case of the beams 1.

In operation, the cup chamber below the diaphragm 7 is filled with a fluid which contacts the lower surface of the diaphragm 7. The opening or connection 11 transmits the pressure to be measured to said fluid and to said diaphragm surface. This pressure causes a corresponding deflection of the central or deflecting portion of the diaphragm 7, a corresponding deflection of the movable end of the beam 10, a corresponding deflection and stressing of the central or stress sensitive portion of the beam 10, and a corresponding straining of the beam 10 which is sensed by the diffused strain sensing resistors. In this operation, the force of the deflecting diaphragm on the connected end of the beam 10 cantilevers the beam on its mounted end at the periphery of the diaphragm 7.

Figure 9:
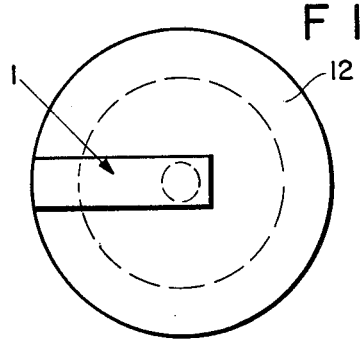
FIGS. 9 and 10 are top and sectional views, respectively, of a diaphragm type pressure transducer having a beam of the type illustrated in FIGS. 1, 2, and 3.
Figure 10:
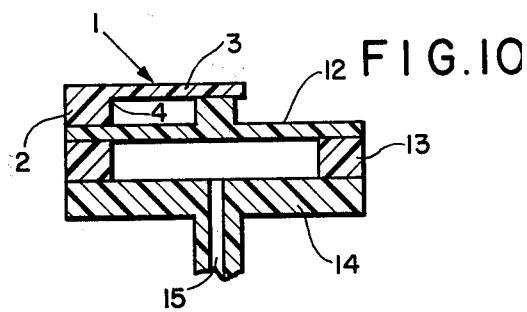

FIGS. 9 and 10 show a modified beam-diaphragm pressure transducer in which a beam 1 such as is illustrated in FIGS. 1, 2, and 3, having the diffused resistors $R_1$ through $R_6$ on the surface thereof, is mounted on a diaphragm 12 which is supported by a ring spacer 13 and a back plate 14 provided with an opening 15. In this arrangement, the massive mounting portion 2 of the beam 1 is mounted, as by a bond, to the flat supported periphery of the diaphragm 12, and the movable end of the beam is connected, as by a bond, to the deflecting central portion of the diaphragm 12. The operation of this arrangement is the same as that of the FIGS. 7 and 8 arrangement except that now the stress sensitive beam portion 3 is desirably cantilevered about the precise fulcrum provided by the abrupt step 4.

Figure 11:
FIG. 11 is a sectional view showing a wire connecting the movable or free end of a beam of the type shown in FIGS. 1 through 3 to an associated diaphragm.

FIG. 11 is a partial section showing a modification of the transducer arrangement of FIGS. 9 and 10 wherein a wire 16 is inserted and connected between the movable end of the beam 1 and a diaphragm 17. The wire 16 is preferably gold eutectic or electrostatic bonded at both ends. Diaphragm 17 may be of the same construction as diaphragm 12 of FIGS. 9 and 10.

Figure 12:
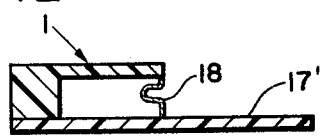
FIG. 12 is a sectional view showing a spring for making the last-mentioned connection.

FIG. 12 shows another modification of the transducer arrangement of FIGS. 9 and 10 wherein a spring 18 is inserted and connected between the movable end of the beam 1 and a diaphragm $17^1$, the connections again being gold eutectic or electrostatic bonds. The diaphragm $17^1$ may again have the same construction as the diaphragm 12 of FIGS. 9 and 10. A wire such as the wire 16, or a spring such as the spring 18, could also be included in the connection between the movable end of the beam and the deflecting portion of the diaphragm in the transducer of FIGS. 7 and 8.

Figure 13:
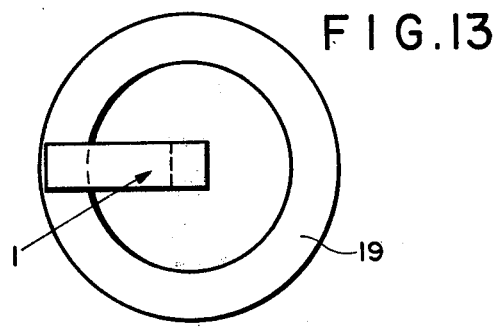
FIGS. 13 and 14 are top and sectional views, respectively, of a diaphragm type pressure transducer employing a beam of the type illustrated in FIGS. 4, 5, and 6.
Figure 14:
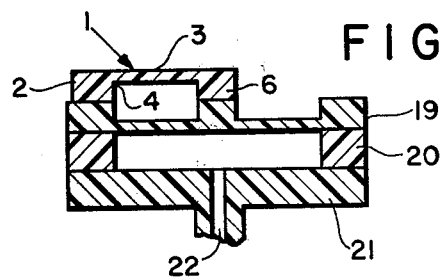

FIGS. 13 and 14 show a further modified beam-diaphragm pressure transducer wherein the beam 1 is of the type shown in FIGS. 4 through 6. In this modification, the massive mounting portion 2 of the beam 1 is bonded to the supported periphery of a diaphragm 19, and the massive terminating portion 6 of the beam 1 is bonded to the central portion of the diaphragm 19. The latter is supported by a ring spacer 20 and a back plate 21 provided with an opening 22. The operation of this arrangement is the same as that of the FIGS. 9 and 10 arrangement except that now the massive terminating portion 6 is desirably included in the connection between the movable end of the beam 1 and the diaphragm 19. This connection may also include a wire or a spring as included in the respective arrangements of FIGS. 11 and 12.

To the end of minimizing the noted additional hysteresis in each of the transducers of FIGS. 7 through 14, the diaphragm, the ring spacer, and the backplate of each transducer are desirably formed of materials, such as glass, quartz, silicon, or a combination thereof, which have an internal viscosity which at least closely approaches, if not equals, the internal viscosity of the associated beam. Similarly, the wire 16 of FIG. 11 and the spring 18 of FIG. 12 are desirably formed of a material, such as glass or quartz, which has an internal viscosity which at least closely approaches that of the associated beam and diaphragm. Also, the noted bonds between the beams, the diaphragms, the ring spacers, and the backplates are desirably ones, such as gold eutectic or electrostatic bonds, which preserve the unitary internal viscosity of the components within the transducers to aid in the minimization of hysteresis therein. This also applies to the noted bonds which connect the wire 16 and the spring 18 to their respective diaphragms and beams. The techniques or processes for effecting gold eutectic or electrostatic bonding are known in the prior art, and thus are not further described herein in order to avoid unduly complicating the present description.

With reference to FIG. 15, it is noted that electrical circuitry 23 is provided in association with the wheatstone bridge 5 which is operative to convert the output of the bridge into a fluid pressure-dependent unidirectional current that varies over a range of values, for example 4 to 20 milliamperes, and which is suitable for transmission to a remote indicating, recording, and/or controlling receiving device 24. The wheatstone bridge 5 and the associated electrical circuitry 23 shown in FIG. 15, including the operation thereof, may well be similar to the circuitry shown and operation described in the Demark U.S. Pat. No. 3,654,545.

There has thus been provided, in accordance with the present invention, an improved differential pressure and process pressure transducer of the diaphragm and diffused semiconductor strain gauge type which employs a cantilever semiconductor beam so as to free the diaphragm of restrictions resulting from the use of diffused semiconductor elements. This construction does not require the attaching of the strain sensitive semiconductor elements, and thus avoids the hysteresis problems which are encountered in the prior art transducers as a result of such attaching. Also, the additional hysteresis problems of the prior art transducers are minimized by the construction of the diaphragm and associated components of materials having substantially the same internal viscosity as that of the associated beam, and by the use of bonds which preserve this unitary internal viscosity. There has also been provided an improved cantilever beam structure having a desirable integral mounting portion and a precise fulcrum, and wherein the attachment of force transmitting and deflection producing means may be made to the movable or free end of the beam without creating concentrations of stress in the beam that result in nonuniform strain patterns. The improved cantilever beam, moreover, is characterized in its small size, which is independent of the size of the diaphragm with which the beam is employed. This small size permits a number of beams to be obtained from a single semiconductor wafer.

The embodiments of the invention in which an exclusive property or privilege is claimed are defined as follows:

1. A pressure transducer with minimized hysteresis, comprising
    a semiconductor beam having a stress sensitive portion,
    a diaphragm formed of a material having an internal viscosity which at least closely approaches that of said beam,
    supporting means for supporting said diaphragm at one portion thereof, pressurizing means for causing a fluid pressure to act on one surface of a deflecting portion of said diaphragm to cause the last mentioned portion to deflect with respect to said one portion by an amount dependent upon said pressure, mounting means for mounting one end of said beam on said supporting means to cantilever said beam from said supporting means, connecting means for connecting the other end of said beam to said deflecting portion of said diaphragm to cause said other end to be deflected by deflection of said deflecting portion, said mounting means and said connecting means being constructed and arranged to preserve the unitary internal viscosity of said beam and said diaphragm within said transducer to minimize the hysteresis exhibited thereby, and a semiconductor strain gauge diffused into the surface of said stress sensitive portion to sense the strain produced therein by the deflection of said other end of said beam.

2. A transducer as specified in claim 1, wherein
said diaphragm is of circular configuration,
said one portion of said diaphragm is the periphery thereof,
said deflecting portion of said diaphragm is the remainder thereof,
said mounting means mounts said one end of said beam on said supporting means at the periphery of said diaphragm, and
said connecting means connects said other end of said beam to said diaphragm at substantially the center thereof.

3. A transducer as specified in claim 2, wherein
said supporting means includes a spacer and a back plate bonded together at their peripheries with said periphery of said diaphragm to form a cup,
said spacer and said back plate have an internal viscosity which at least closely approaches that of said diaphragm and said beam,
said cup is filled with a fluid which contacts said surface of said diaphragm, and
said pressurizing means includes a fluid connection into said cup to transmit said fluid pressure to said fluid and to said surface of said diaphragm.

4. A transducer as specified in claim 3, wherein said diaphragm, said spacer, and said back plate are formed of glass, quartz, silicon, or a combination thereof, and wherein said bonding is gold eutectic or electrostatic.

5. A transducer as specified in claim 1, wherein said semiconductor material is silicon.

6. A transducer as specified in claim 1, wherein
said beam has a mounting portion at said one end which is massive relative to said stress sensitive portion and which provides an abrupt step at the juncture of said mounting portion and said stress sensitive portion, and
said mounting means mounts said mounting portion on said supporting means to cause said juncture to provide a precise fulcrum for said stress sensitive portion.

7. A transducer as specified in claim 6, wherein
said beam has a terminating portion at said other end which is massive relative to said stress sensitive portion, and
said terminating portion is included in said connecting means.

8. A transducer as specified in claim 7, wherein said beam is a unitary beam fabricated from a single block of material.

9. A transducer as specified in claim 6, wherein said beam is a unitary beam fabricated from a single block of material.

10. A transducer as specified in claim 1, wherein said beam is formed of a single crystal of semiconductor material.

11. A transducer as specified in claim 1, wherein
said beam has a terminating portion at said other end which is massive relative to said stress sensitive portion, and
said terminating portion is included in said connecting means.

12. A transducer as specified in claim 11, wherein said beam is a unitary beam fabricated from a single block of material.

13. A transducer as specified in claim 1, wherein said connecting means includes a wire through which said deflecting portion of said diaphragm deflects said other end of said beam, the material of said wire having an internal viscosity which at least closely approaches that of said diaphragm and said beam.

14. A transducer as specified in claim 1, wherein said connecting means includes a spring through which said deflecting portion of said diaphragm deflects said other end of said beam, the material of said spring having an internal viscosity which at least closely approaches that of said diaphragm and said beam.

15. A transducer as specified in claim 1, wherein
said mounting means is a bond between said one end of said beam and said one portion of said diaphragm, and
said connecting means is a bond between said other end of said beam and said deflecting portion of said diaphragm.

16. A transducer as specified in claim 15, wherein said bonds are gold eutectic or electrostatic bonds.

17. A transducer as specified in claim 16, wherein said diaphragm material is glass, quartz, silicon, or a combination thereof.

18. A transducer as specified in claim 1, wherein said diaphragm material is glass, quartz, silicon, or a combination, thereof.

19. A transducer, comprising
a unitary beam fabricated from a single block of material and having a mounting portion at one end and a stress sensitive portion extending from said mounting portion, the latter being massive relative to said stress sensitive portion and providing an abrupt step at the juncture of said portions which constitutes a precise fulcrum for said stress sensitive portion, and
sensing means disposed in association with said stress sensitive portion to sense strain induced therein as the result of the application of force to the other end of said beam.

20. A transducer as specified in claim 19, wherein said beam is formed of a single crystal of semiconductor material.

21. A transducer as specified in claim 20, wherein said sensing means includes a semiconductor strain gauge diffused into the surface of said stress sensitive portion.

22. A transducer as specified in claim 19, wherein
said beam has a terminating portion at said other end which is massive relative to said stress sensitive portion and which facilitates said application of force to said other end.

23. A transducer as specified in claim 22, wherein said beam is formed of a single crystal of semiconductor material.

24. A transducer as specified in claim 23, wherein said sensing means includes a semiconductor strain gauge diffused into the surface of said stress sensitive portion.

25. A transducer, comprising
a unitary beam fabricated from a single block of material and having one end arranged to be supported, having a terminating portion at its other end, and having a stress sensitive portion between said ends, said terminating portion being massive relative to said stress sensitive portion, and
sensing means disposed in association with said stress sensitive portion to sense strain induced therein as a result of the application of force to said terminating portion.

26. A transducer as specified in claim 25, wherein said beam is formed of a single crystal of semiconductor material.

27. A transducer as specified in claim 26, wherein said sensing means includes a semiconductor strain gauge diffused into the surface of said stress sensitive portion.

28. A pressure transducer with minimized hysteresis, comprising
a semiconductor beam having first and second ends,
a diaphragm having a periphery by which said diaphragm is supported, having a central portion which is arranged to be deflected with respect to said periphery by an amount dependent upon the pressure of a fluid acting on a surface of said central portion, and formed of a material having an internal viscosity which at least closely approaches that of said beam and which, when bonded to said beam, forms therewith a structure exhibiting a minimum of hysteresis,
a bond bonding said first end of said beam to said supported periphery of said diaphragm to cantilever said beam from said first end thereof,
a bond bonding said second end of said beam to said central portion of said diaphragm for deflection of said second end with respect to said first end in accordance with said deflection of said central portion, and
a semiconductor strain gauge diffused into the surface of said beam between said first and second ends thereof to sense said deflection of said second end and hence said fluid pressure.

* * * * *